US009381621B2

(12) United States Patent
Taylor et al.

(10) Patent No.: US 9,381,621 B2

(45) Date of Patent: Jul. 5, 2016

(54) TOOLING FIXTURE AND SYSTEM

(71) Applicants: Chris Taylor, San Diego, CA (US); Steve Grangetto, San Diego, CA (US)

(72) Inventors: Chris Taylor, San Diego, CA (US); Steve Grangetto, San Diego, CA (US)

(*) Notice: Subject to any disclaimer, the term of this patent is extended or adjusted under 35 U.S.C. 154(b) by 0 days.

(21) Appl. No.: 14/624,801

(22) Filed: Feb. 18, 2015

(65) Prior Publication Data

US 2015/0158150 A1 Jun. 11, 2015

Related U.S. Application Data

(63) Continuation-in-part of application No. 14/023,690, filed on Sep. 11, 2013.

(60) Provisional application No. 61/700,010, filed on Sep. 12, 2012.

(51) Int. Cl.

| | |
|---|---|
| ***B25B 1/20*** | (2006.01) |
| ***B23Q 3/06*** | (2006.01) |
| ***B25B 1/24*** | (2006.01) |
| ***B25B 1/10*** | (2006.01) |

(52) U.S. Cl.

CPC ................ *B25B 1/2473* (2013.01); *B23Q 3/06* (2013.01); *B25B 1/103* (2013.01); *B25B 1/2405* (2013.01); *B25B 1/20* (2013.01); *Y10T 409/309016* (2015.01); *Y10T 409/309072* (2015.01)

(58) Field of Classification Search

CPC .......... B25B 1/02; B25B 1/20; B25B 1/2405; B25B 1/2473; B25B 1/103; B25B 5/02; B25B 5/108; B25B 9/104; B25B 27/302; B23Q 3/06; B23Q 3/062; B23Q 2703/02; B23Q 2703/10

USPC .......................................................... 409/225

See application file for complete search history.

(56) References Cited

U.S. PATENT DOCUMENTS

| | | | | | |
|---|---|---|---|---|---|
| 150,180 | A | * | 4/1874 | Morris | 269/245 |
| 453,459 | A | * | 6/1891 | Baker | 269/240 |
| 703,376 | A | * | 7/1902 | Bingham | 269/247 |
| 1,176,019 | A | * | 3/1916 | Baker | 269/246 |
| 1,488,559 | A | * | 4/1924 | Simokaitis | 29/560.1 |
| 1,549,278 | A | | 8/1925 | Sutherland | |
| 1,586,959 | A | * | 6/1926 | Foster | 269/165 |
| 2,239,736 | A | * | 4/1941 | Reimschissel et al. | 408/153 |
| 2,406,780 | A | * | 9/1946 | Kutscha | 407/38 |
| 2,625,861 | A | * | 1/1953 | Swanson | 269/157 |
| 2,734,410 | A | * | 2/1956 | Gipperich | 269/241 |
| 3,370,508 | A | * | 2/1968 | Iaia | 409/132 |
| 3,506,253 | A | * | 4/1970 | Swenson | 269/137 |
| 3,808,655 | A | * | 5/1974 | Foster | 407/73 |
| 3,834,435 | A | | 9/1974 | McCord, Jr. | |
| 4,057,294 | A | * | 11/1977 | Krekeler | 299/102 |
| 4,174,919 | A | * | 11/1979 | Knopp | 408/151 |

(Continued)

FOREIGN PATENT DOCUMENTS

| | | | | | |
|---|---|---|---|---|---|
| CH | 285552 | A | * | 9/1952 | B25B 1/103 |
| DE | 10002416 | A1 | * | 9/2000 | B25B 1/2405 |

(Continued)

*Primary Examiner* — Sunil K Singh

*Assistant Examiner* — Ryan Rufo

(74) *Attorney, Agent, or Firm* — Mark Wisnosky

(57) ABSTRACT

A fixture and cutter tool is described. The fixtures includes features that enable a work piece to be easily mounted and removed by a rotation motion of the work piece onto the top of the fixture. The system includes the fixture and a cutter tool to prepare the work piece for use with the fixture.

3 Claims, 18 Drawing Sheets

(56) References Cited

U.S. PATENT DOCUMENTS

| | | | | |
|---|---|---|---|---|
| 4,251,066 | A | 2/1981 | Bowling | |
| 4,429,887 | A | 2/1984 | Smith | |
| 4,833,831 | A * | 5/1989 | Armstrong, Jr. | 451/124 |
| 4,958,818 | A * | 9/1990 | Buchter | 269/136 |
| 5,019,129 | A * | 5/1991 | Johanson | 269/71 |
| 5,149,071 | A * | 9/1992 | Oliveira | 269/43 |
| 5,163,662 | A * | 11/1992 | Bernstein | 269/136 |
| 5,487,538 | A * | 1/1996 | Tibbet | 269/71 |
| 5,704,736 | A * | 1/1998 | Giannetti | 407/35 |
| 5,769,577 | A * | 6/1998 | Boddy | 408/231 |
| 6,957,809 | B1 | 10/2005 | Ferrara et al. | |
| 8,020,877 | B2 | 9/2011 | Lang | |
| 8,158,242 | B2 | 4/2012 | Nishihata et al. | |
| 8,322,699 | B2 | 12/2012 | Prell et al. | |
| 8,905,691 | B2 * | 12/2014 | Ma et al. | 409/138 |
| 2010/0219573 | A1 | 9/2010 | O'Rell et al. | |
| 2010/0295227 | A1 * | 11/2010 | Hung | 269/244 |
| 2011/0316213 | A1 * | 12/2011 | Chen | 269/240 |
| 2012/0068393 | A1 | 3/2012 | Van der Vosse et al. | |

FOREIGN PATENT DOCUMENTS

| | | | | |
|---|---|---|---|---|
| EP | 0742081 | | 11/1996 | |
| EP | 0835725 | A1 * | 4/1998 | B25B 1/103 |
| GB | 129987 | A * | 7/1920 | B25B 1/103 |
| GB | 1158493 | A * | 7/1969 | B23Q 3/06 |

* cited by examiner

TOOLING FIXTURE AND SYSTEM

CROSS-REFERENCE TO RELATED APPLICATIONS

This application is a continuation in part of application Ser. No. 14/023,690 filed Sep. 11, 2013 titled Tooling Fixture and System by the same inventors and currently pending.

BACKGROUND OF THE INVENTION

1. Technical Field

The present invention relates to a tooling fixture and cutter that together form a system for holding a workpiece for machining.

2. Related Background Art

A tooling fixture is used to hold a workpiece during intricate machining such as 5 axis machining. The fixture system requires that the workpiece be held securely and precisely and provides access to a machine tool to all facets of the workpiece. Preferably it is possible to prepare the raw stock and easily and removably mount the stock in the fixture to present to a machine to create a part. Previous systems for holding a workpiece exist but lack the refinements described herein to allow easy insertion and removal of the work piece into and from the fixture and the cutting tool to prepare the work piece for the specific fixture. Prior art designs required insertion of the work piece into the tooling fixture by either sliding from an edge or very careful insertion from above with likelihood of damaging the dove tail on the work piece.

DISCLOSURE OF THE INVENTION

A tooling fixture that includes a dovetail groove to hold a work piece is described. The dovetail groove is specifically designed to allow easy attachment and removal of the workpiece. The design provides a means to easily place the work piece into the tool by insertion of one edge of a mating dovetail protuberance on the work piece into the dovetail groove by fitting a first edge and rotating the work piece down into the groove. The groove on the tooling fixture includes a flat portion on the dovetail section and a wall on the side of the groove opposite the dovetail that meets the base of the groove at an angle greater than ninety degrees. In a preferred embodiment the angle is between 91 and 95 degrees.

In one embodiment a clamping mechanism used with the tooling fixture includes a shaft and hole for alignment of two sides of the fixture. In another embodiment the clamping mechanism uses a mating v-shaped structure to align two sides of the fixture.

In another embodiment a cutting tool that is used to prepare the work piece is described. The cutting tool is used to cut a dovetail protuberance on the work piece that is tailored to fit the dovetail groove of the fixture.

BRIEF DESCRIPTION OF THE DRAWINGS

Features are numbered equivalently through all drawings.

MODES FOR CARRYING OUT THE INVENTION

Figure 1:
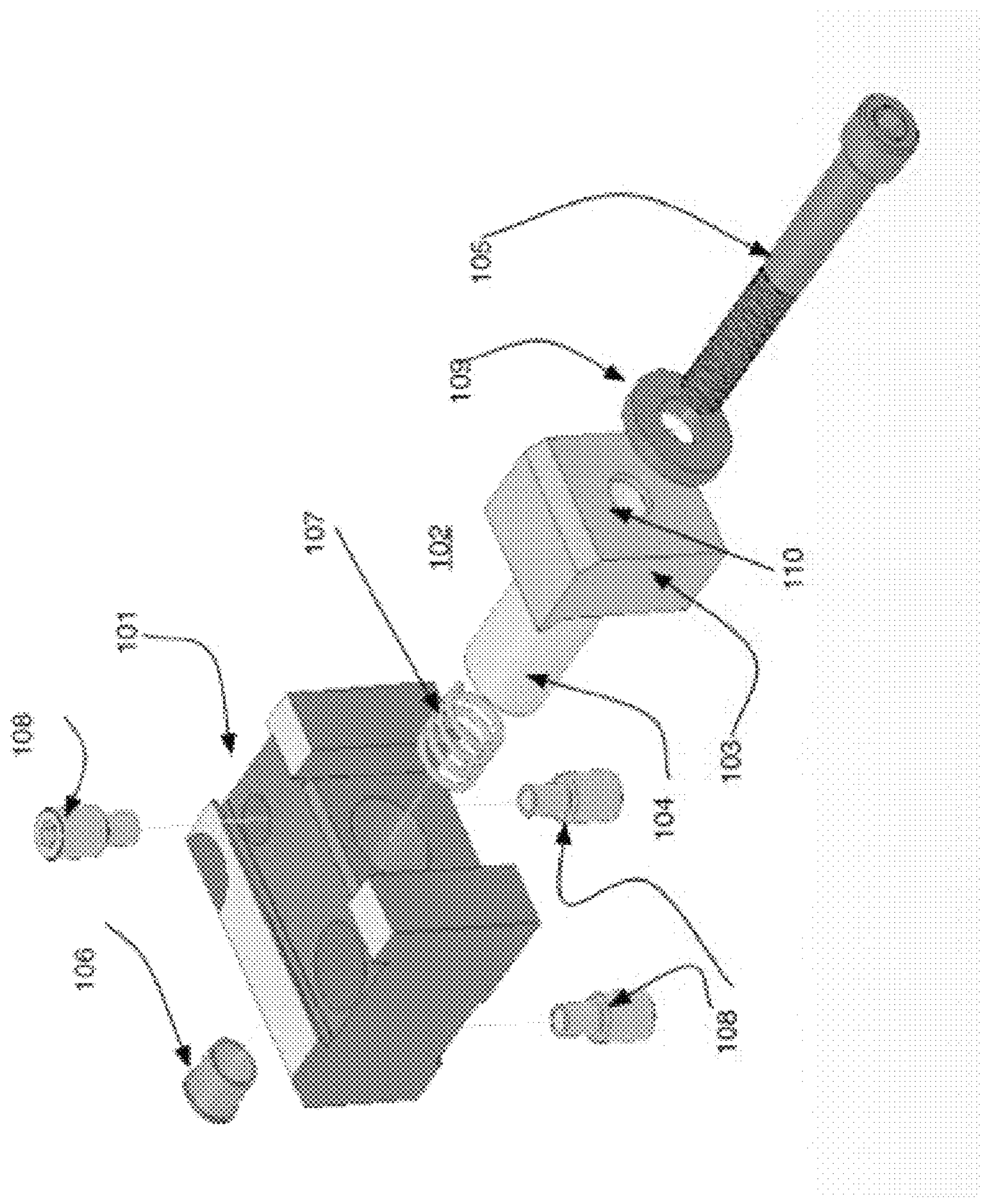
FIG. 1 is a shaded solid diagram of an embodiment of the tooling fixture.

Referring to FIG. 1, a tooling fixture is shown. The tooling fixture is comprised a fixture block 101 and a clamping block 102. The clamp includes a clamping block 103 and a shaft 104 the shaft mates with the fixture block 101. The clamping block is held to the fixture block with clamping screw 105. The screw 105 fits through the clamping washer 109 and hole 11 in the clamping block and through shaft 104, spring 107 and is held in place by threaded collar 106. The fixture further includes locating pins 108. The locating pins are at known locations relative to the components of the fixture block 101 and serve as indicia when to align the fixture (and a workpiece) and the machine used to mill or otherwise fashion a part from the work piece.

Figure 2:
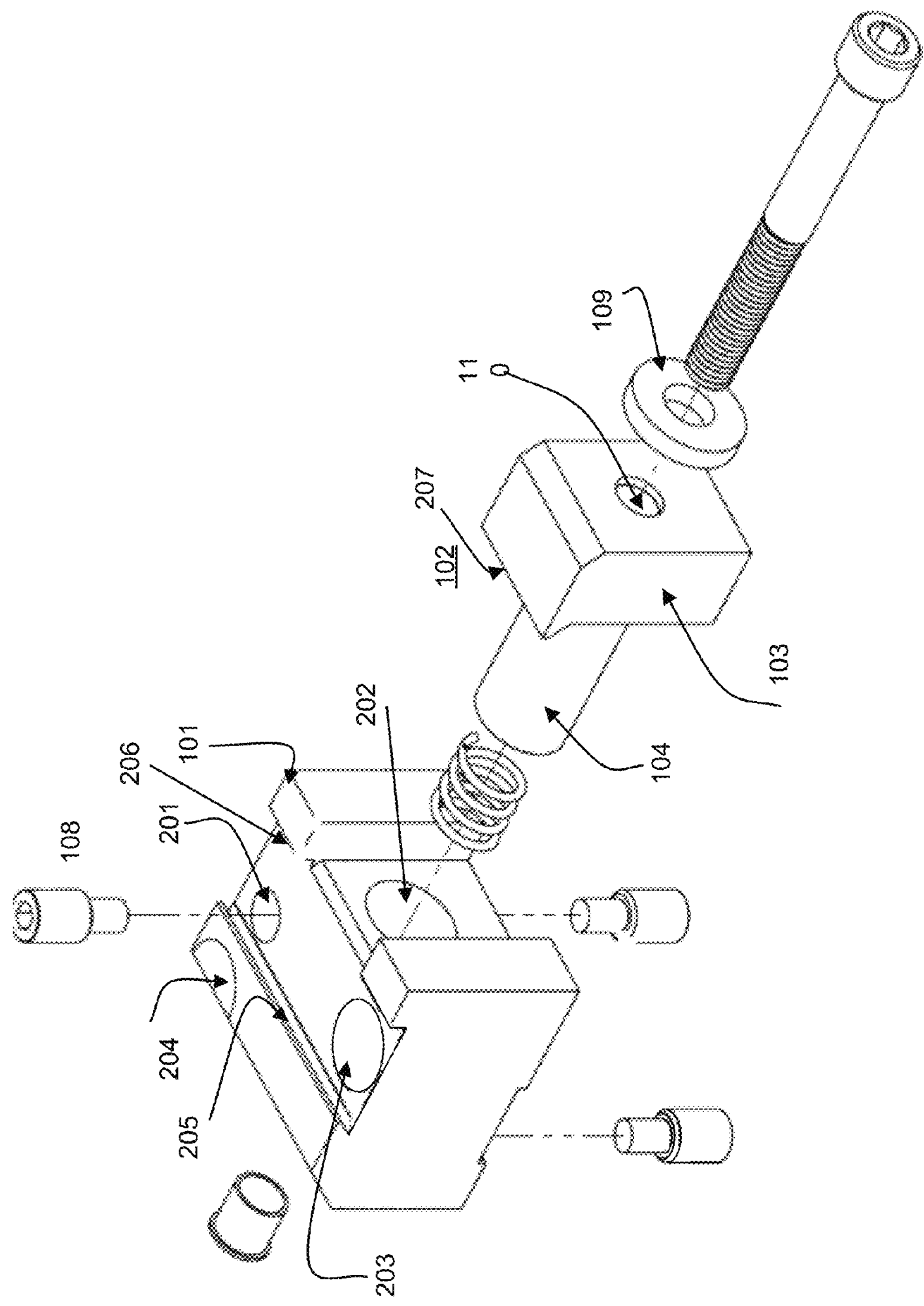
FIG. 2 is a line drawing of the model drawing of FIG. 1.

Referring to FIG. 2, the same fixture as seen in FIG. 1 is shown. Features with the same numbers as those in FIG. 1 have already been described. The shaft 104 on the clamping block 102 fits within a receiving hole 202 and the clamping block is then clamped to the fixture block. The shaft 104 and the receiving hole 202 are sized and positioned such that when mated the clamping edges 205, 206 of the clamping block are aligned parallel to the clamping edge 207 of the clamping block. Tension is provided by spring 107 already described. The fixture block 101 further includes holes 203 and 204 to allow access for visual alignment of the fixture to the machine.

Figure 3:
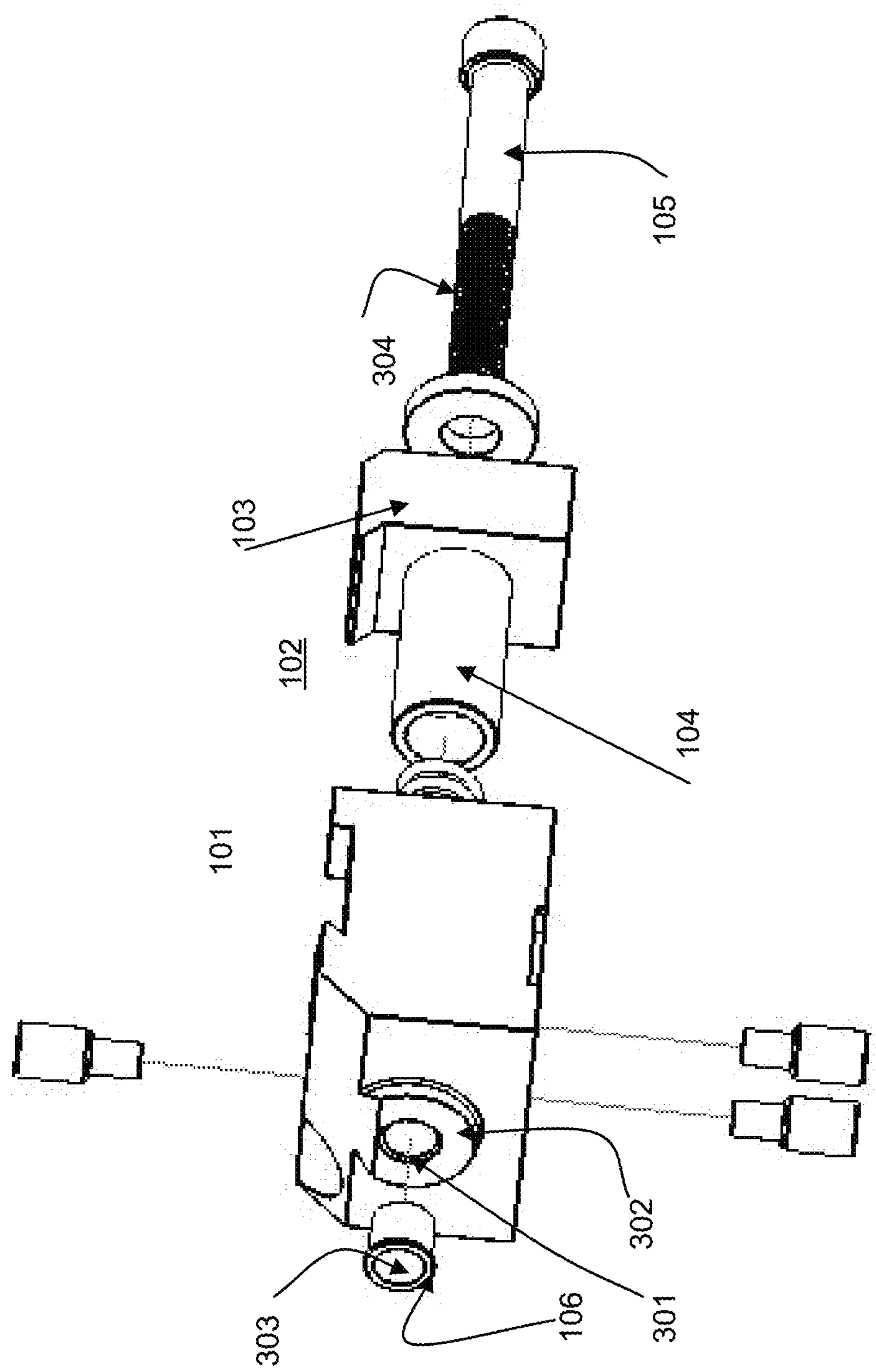
FIG. 3 is an alternate perspective view of the fixture of FIG. 2.

Referring to FIG. 3 a perspective drawing from another angle is provided. Again features numbered less than 300 have already been described. The fixture block 101 further includes mounting hole 301 fit in mounting piece 302. Threaded collar 106 is sized to fit within the mounting hole 301 and the interior 303 of the collar matches threading 304 on the screw 105.

Figure 4:
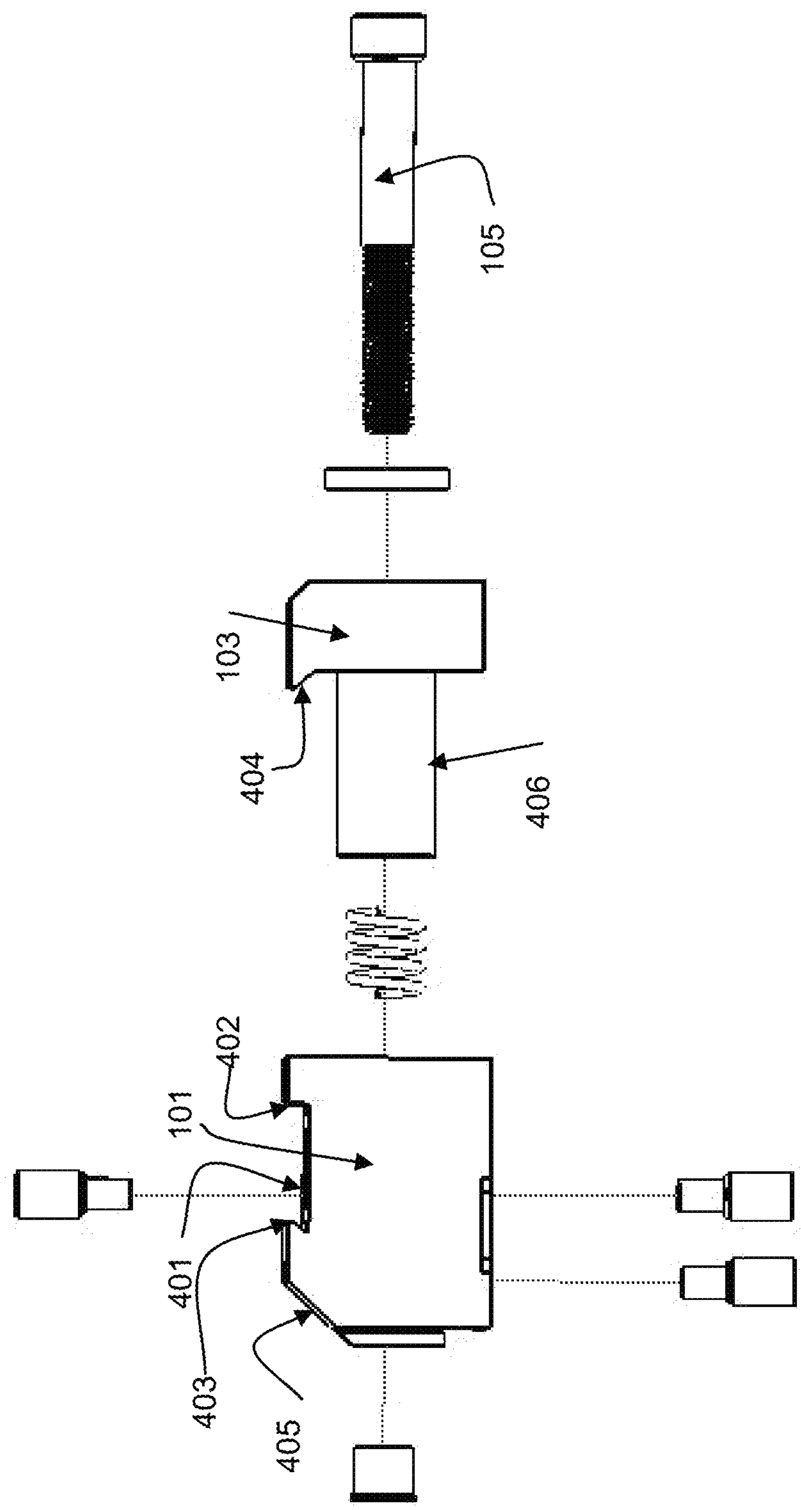
FIG. 4 is a side view of fixture of FIGS. 1-3.

Referring now to FIG. 4 additional details (401-405) are described. FIG. 4 shows a side view of the same fixture shown in FIGS. 1-3. The fixture block 101 includes a dovetail groove 401. The groove consists of a flat base section also numbered 401 and two edge walls 402 and 403. The first edge wall 402 in the preferred embodiment makes an angle greater than 90 degrees with the base 401. Details are shown in later Figures. The second edge 403 makes an angle less than 90 degrees with the base and thereby creates an edge that will mate with an edge of a dovetail on the work piece. The edges 402, 403 are parallel to one another. The clamping block 103 also includes a dovetail edge 404 such that when a work piece with a dovetail is inserted into the fixture and the clamping block is screwed into place the edges 403, 404 with the base 401 form a dove tail that mates with the corresponding dovetail protuberance on the workpiece. The shaft 406 mates with a receiving hole on the fixture block 101. The shaft and the receiving hole are sized and positioned such that when mated the edges 402, 403, 404 are all parallel. The receiving hole on the fixture block is not visible in the view of FIG. 4 but is the same as was shown in FIG. 2. The fixture block further has a beveled corner 405 that allows clearance for the workpiece as it is inserted into the groove.

Figure 5:
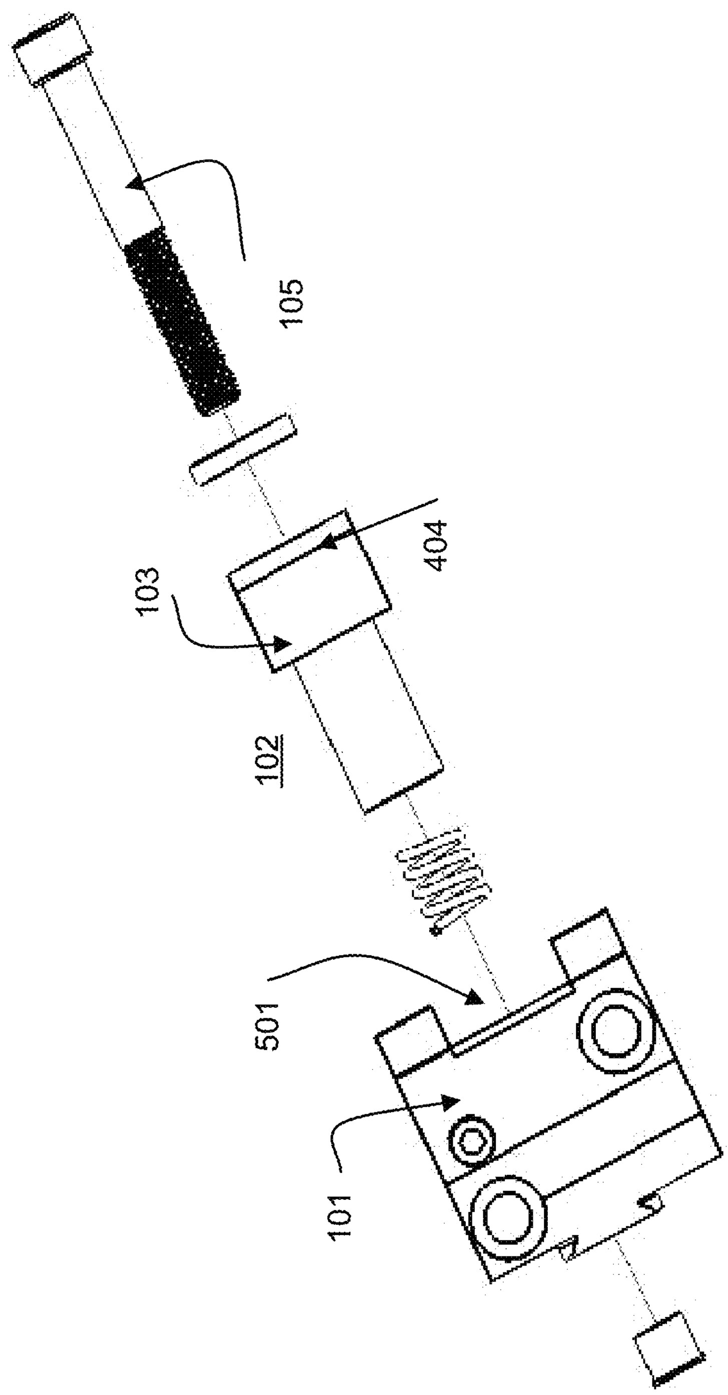
FIG. 5 is a top view of the fixture of FIGS. 1-3.

FIG. 5 shows a top down view of the fixture of FIGS. 1-4. The added visible feature is the notch 501 in the fixture block 101. The clamping block 103 fits into the notch 501 such that beveled edge 404 engages the work piece and clamps it to the fixture block 101.

Figure 6:
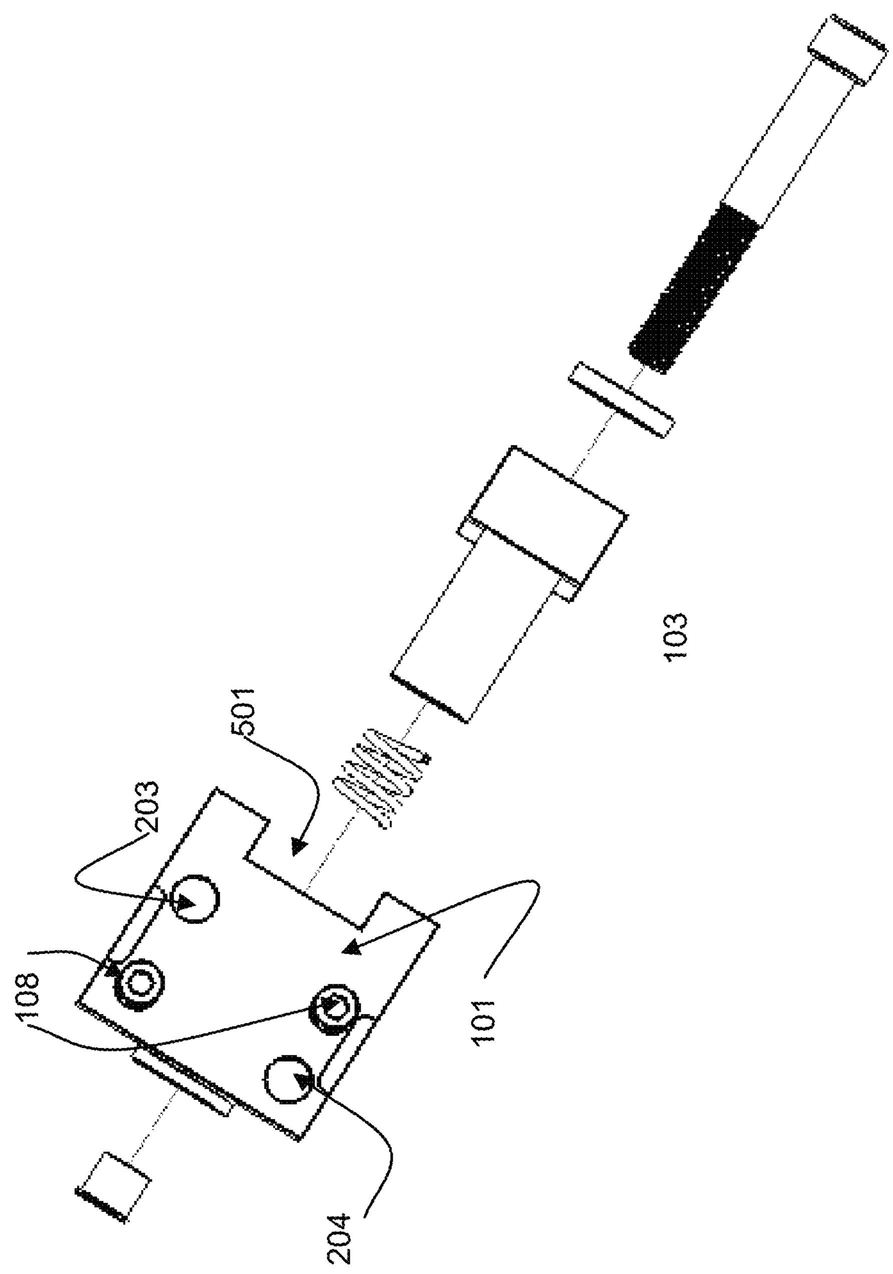
FIG. 6 is a bottom view of the fixture of FIGS. 1-3.

FIG. 6 shows a bottom up view of the same fixture as shown and described in FIG. 1-5. All features have been previously described and are shown here for clarity purposes only.

Figure 7:
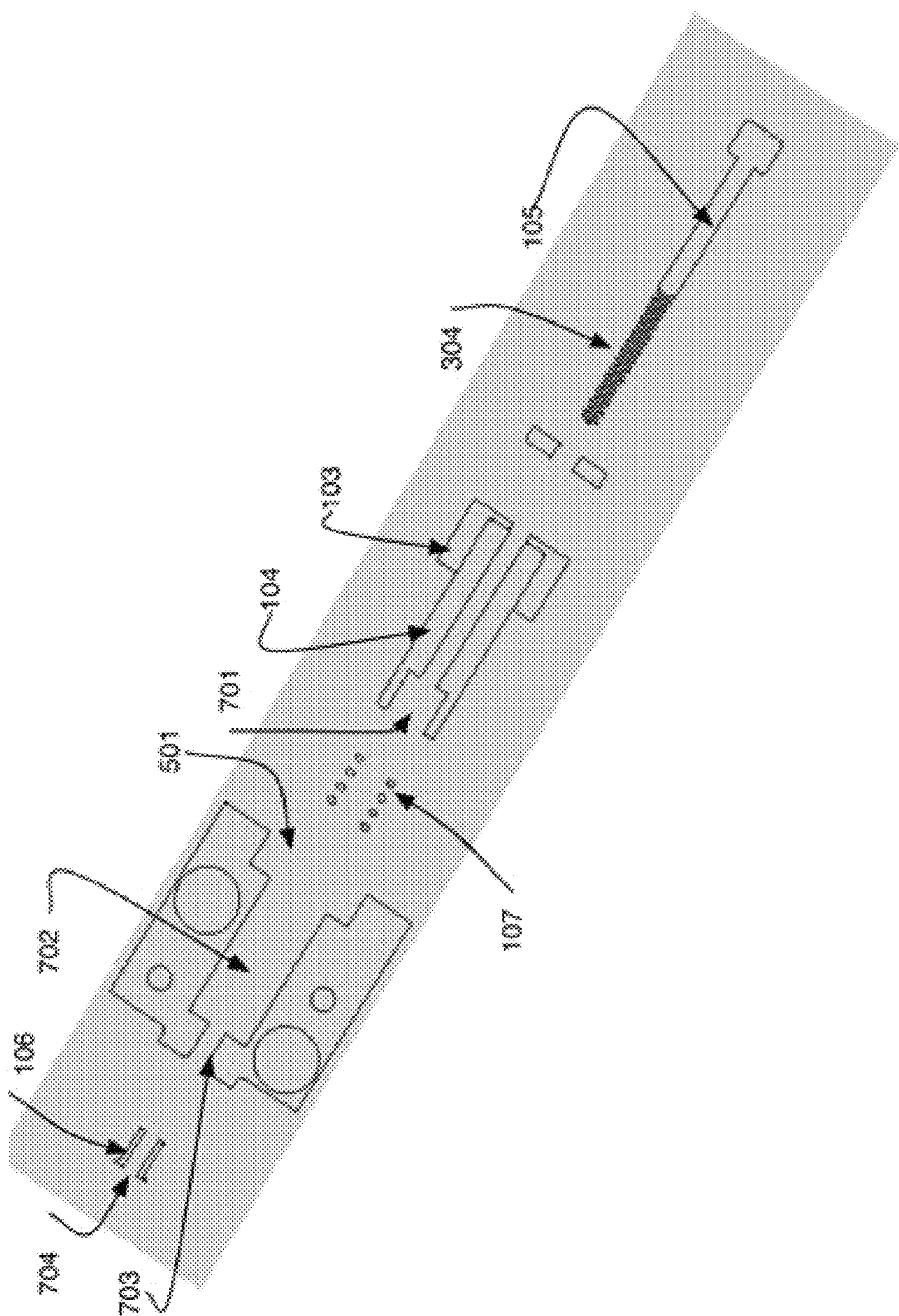
FIG. 7 is a cross-section view of the fixture of FIGS. 1-3.

FIG. 7 shows a bottom up cross-sectional view of the same fixture as in the previous Figures. Additional features 701-704 are visible. The fixture includes a widened area within the shaft 104 of the clamp 102 (not numbered) The widening 701 accommodates the spring 107 such that when the shaft 104 is inserted into the cavity 702 within the fixture block the spring will be compressed as it meets the end 703 of the cavity. The threaded 304 screw 105 holds the clamp in place and is threaded 704 into the collar 106.

Figure 8:
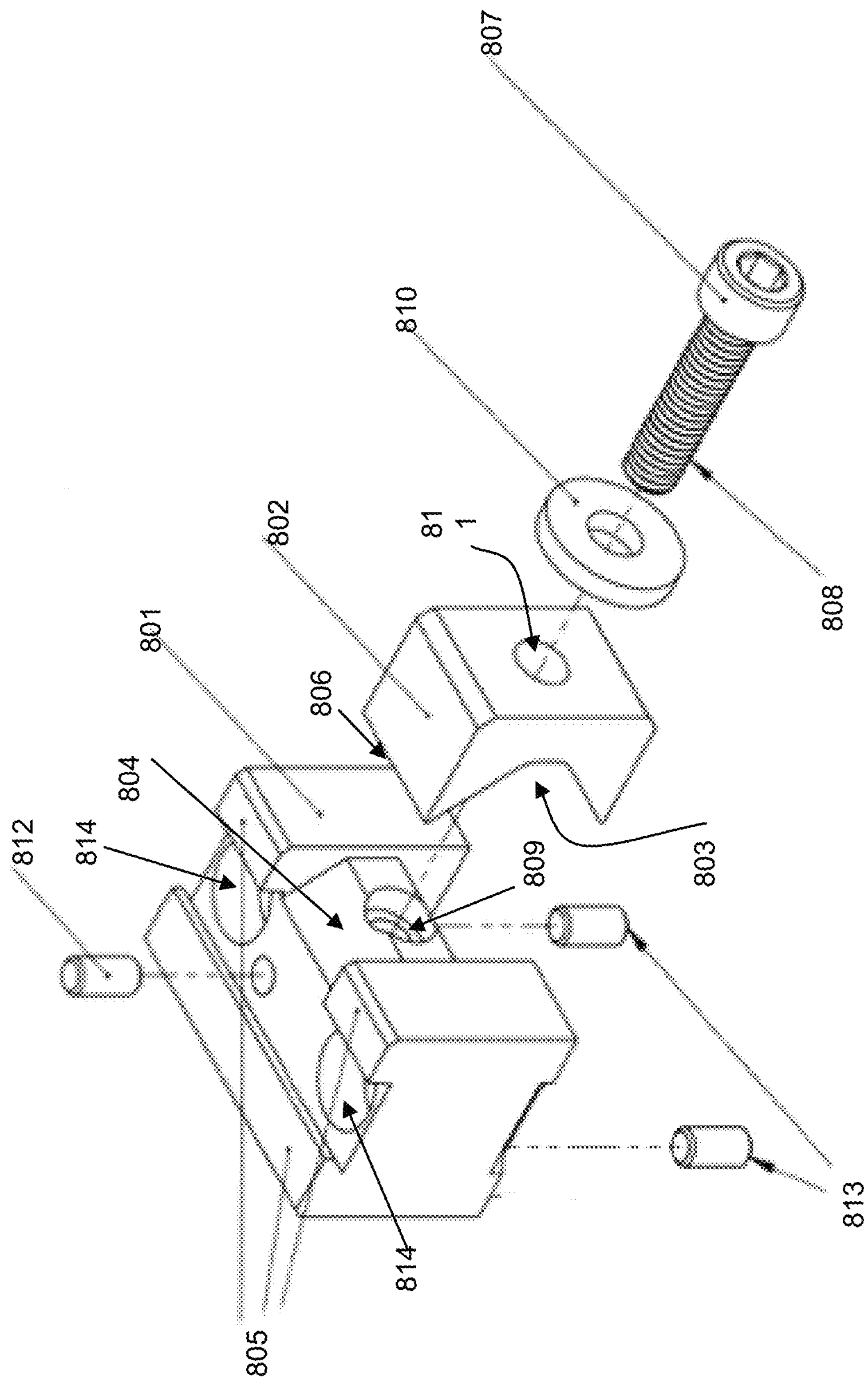
FIG. 8 is a line drawing of a second embodiment of a tooling fixture.

Referring to FIG. 8, a second embodiment of a tooling fixture is shown. The tooling fixture is comprised a block 801 and a clamp 802. The clamp includes a clamping block 802 but does not rely on a shaft (104 in FIG. 2) as in the previous embodiment to align the clamping block with the block 801. In this embodiment, alignment of the clamping block 802 with the block 801 is accomplished with V-shaped protruding region or fitments on the block 804 and a V-shaped indented region or fitment on the clamping block 803. The fitments 803, 804 are sized and shaped such that when mated the block 801 and the clamping block 802 are aligned. Alignment means that the ridges 805 are parallel to the ridge 806 on the clamping block. The clamping block is held to the fixture block with clamping screw 807. The screw 807 fits through the clamping washer 810 and hole 811 in the clamping block. The screw is threaded 808 to match threads within hole 809 on the block. Clamping screw 807 can therefore be screwed into the hole 809 and hold clamping block 802 against block 801. In practice the clamping ridges 805 on the block 801 and the tightening of clamping block 802 against block 801 will securely hold a work-piece (not shown) in place during machining. In one embodiment the shapes of the dovetail on clamping ridges 805 are as described in FIGS. 10 and 11. The fixture further includes locating pins 812, 813. The locating pins are at known locations relative to the components of the fixture block 801 and serve as indicia when to align the fixture (and a workpiece) and the machine used to mill or otherwise fashion a part from the work piece. The fixture block 801 further includes holes 814 to allow visual alignment of the fixture to a milling machine.

Figure 9:
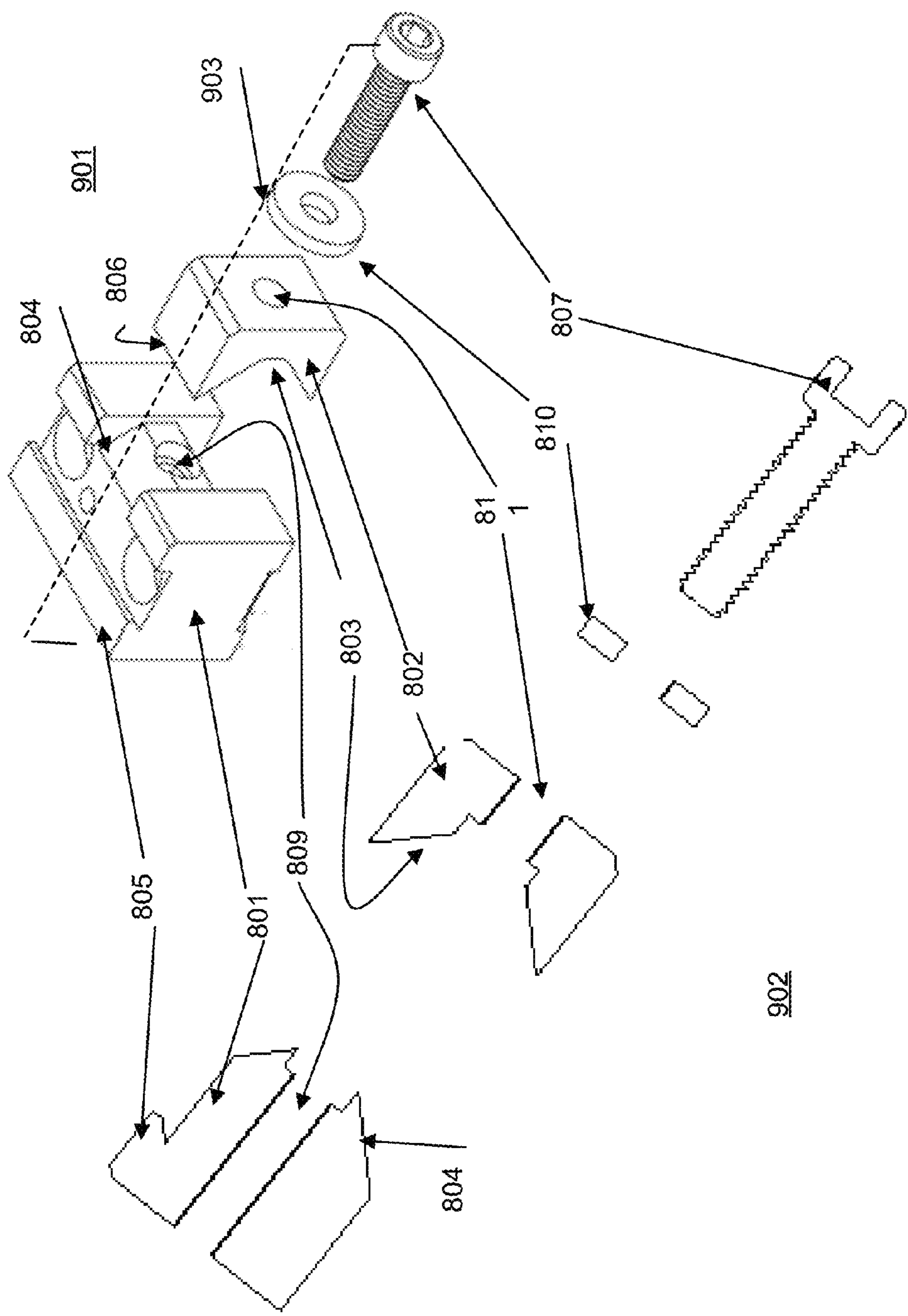
FIG. 9 is a cross-section view of the fixture of FIG. 8.

Details are further illustrated in FIG. 9. A first view 901 is the same as that shown in FIG. 8 and a second view 902 is a cross-section along the line 903. Common features are numbered the same in FIGS. 8 and 9. The tooling fixture is comprised of a block 801 and a clamp 802. The block and clamp fit together through mating surfaces 803, 804 that when contacted and pressed together by the screw 807, clamp a workpiece (not shown) between the dovetail ridges 805, 806. The screw fits through the washer 810 and the hole 811 in the clamp and mates with the threaded hole 809 in the block 801.

Figure 10:
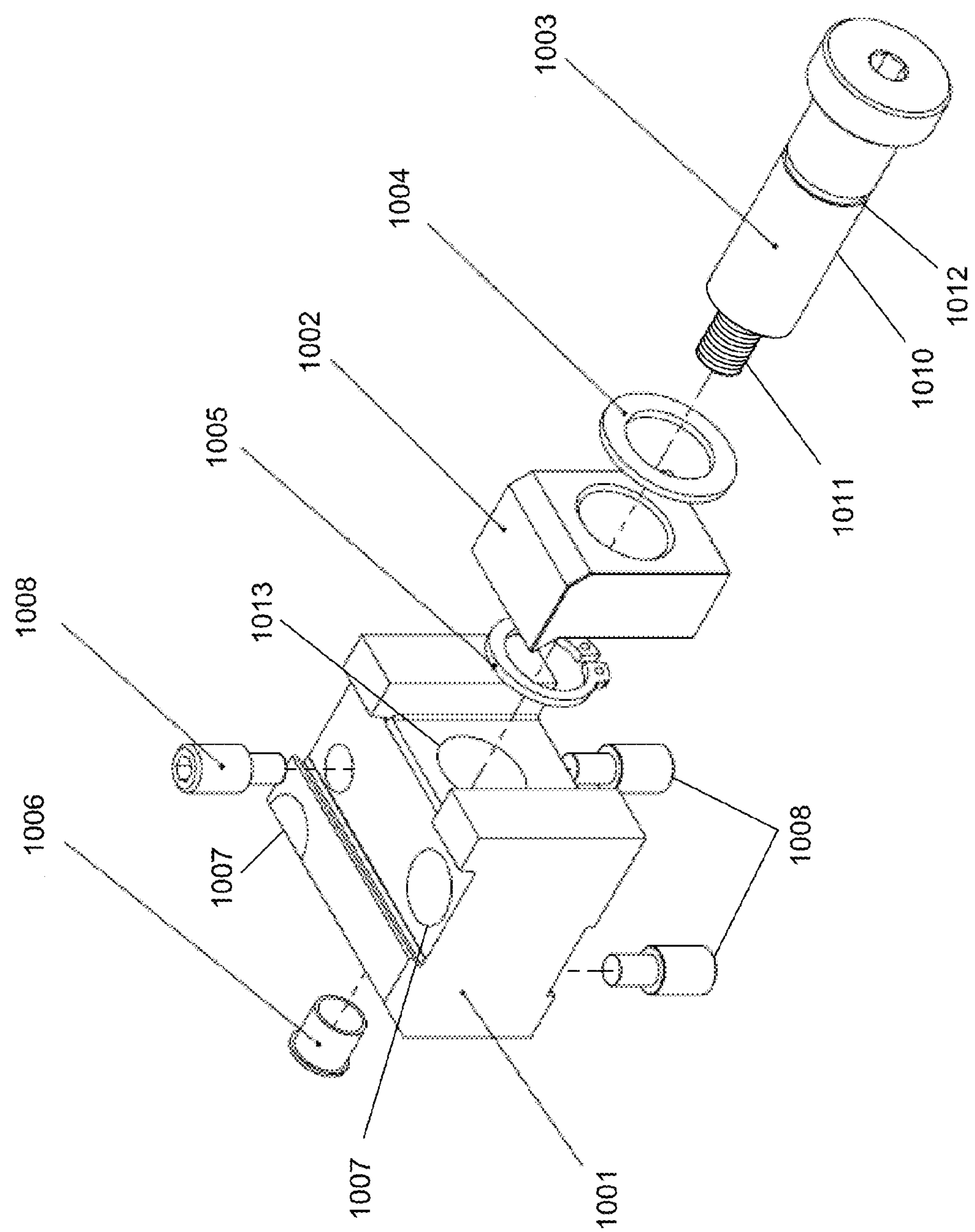
FIG. 10 shows an exploded view of a third embodiment of a tooling fixture.

FIG. 10 shows a third embodiment of the tooling fixture. The tooling fixture comprises a fixture block 1001 and a clamping block 1002. The clamping block 1002 is held to the fixture block 1001 using a custom shoulder bolt 1003. Custom shoulder bolt 1003 includes a precisely machined shoulder shaft 1010 and a threaded shaft 1011 having a smaller diameter than the shoulder shaft. The shoulder bolt 1003 fits through clamping washer 1004 and through a hole in clamping block 1002 which is held in position using a retainer ring 1005 which fits into a slot 1012 machined into the shoulder shaft 1010. Shoulder bolt 1003 continues through a receiving hole 1013 in fixture block 1001 and is held in place by a threaded collar 1006 inserted into a hole in the rear of the fixture block 1001. The fixture further includes locating pins 1008, which are placed at known locations relative to the components of fixture block 1001 and serve as indicia in aligning the fixture to the machine tool. The fixture block 1001 further includes holes 1007 to allow access for visual alignment of the fixture to the machine.

Figure 11:
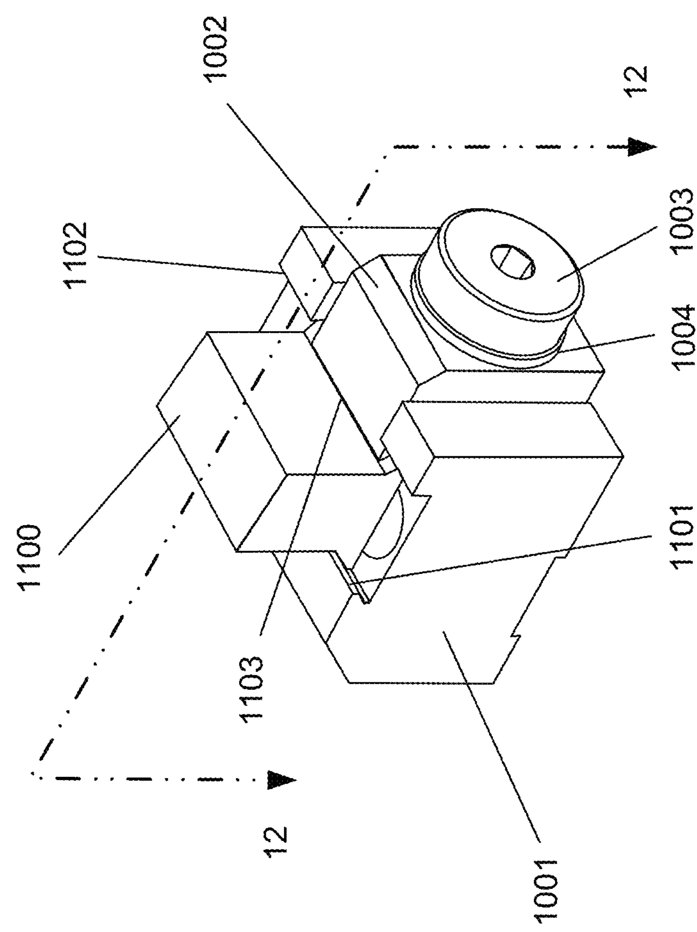
FIG. 11 shows a view of the assembled fixture shown in FIG. 10.

FIG. 11 shows a view of the assembled fixture seen in FIG. 10 clamping a workpiece 1100. Features having the same numbers as those in FIG. 10 have already been described. The shoulder shaft 1010 and the receiving hole 1013 are sized and positioned such that when mated the clamping edges 1101 and 1102 of the fixture block 1001 are aligned parallel to the to the clamping edge 1103 of the clamping block 1002.

Figure 12:
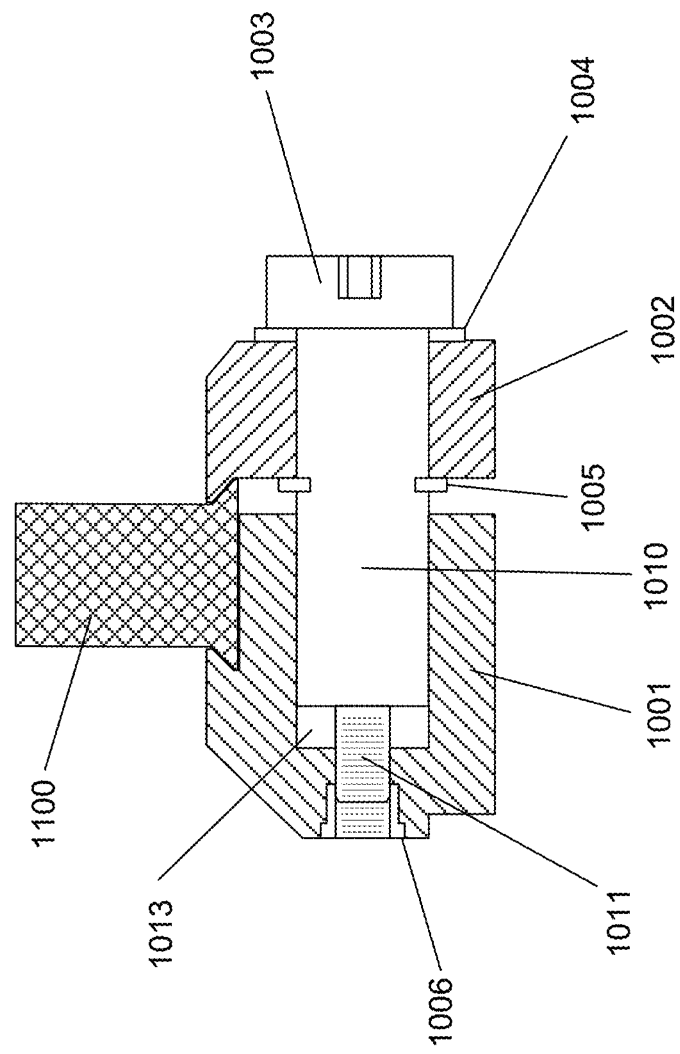
FIG. 12 shows a cross-sectional view of the fixture shown in FIG. 11.

FIG. 12 shows a cross-sectional view of the fixture shown in FIGS. 10 and 11 and illustrates how the shoulder shaft 1010 of the shoulder bolt 1003 fits within the receiving hole 1013 of the fixture block 1001, and how the threaded shaft 1011 of the shoulder bolt 1003 mates with the threaded collar 1006 installed on the back surface of fixture block 1001. Features having the same numbers as those in FIGS. 10 and 11 have already been described.

Figure 13:
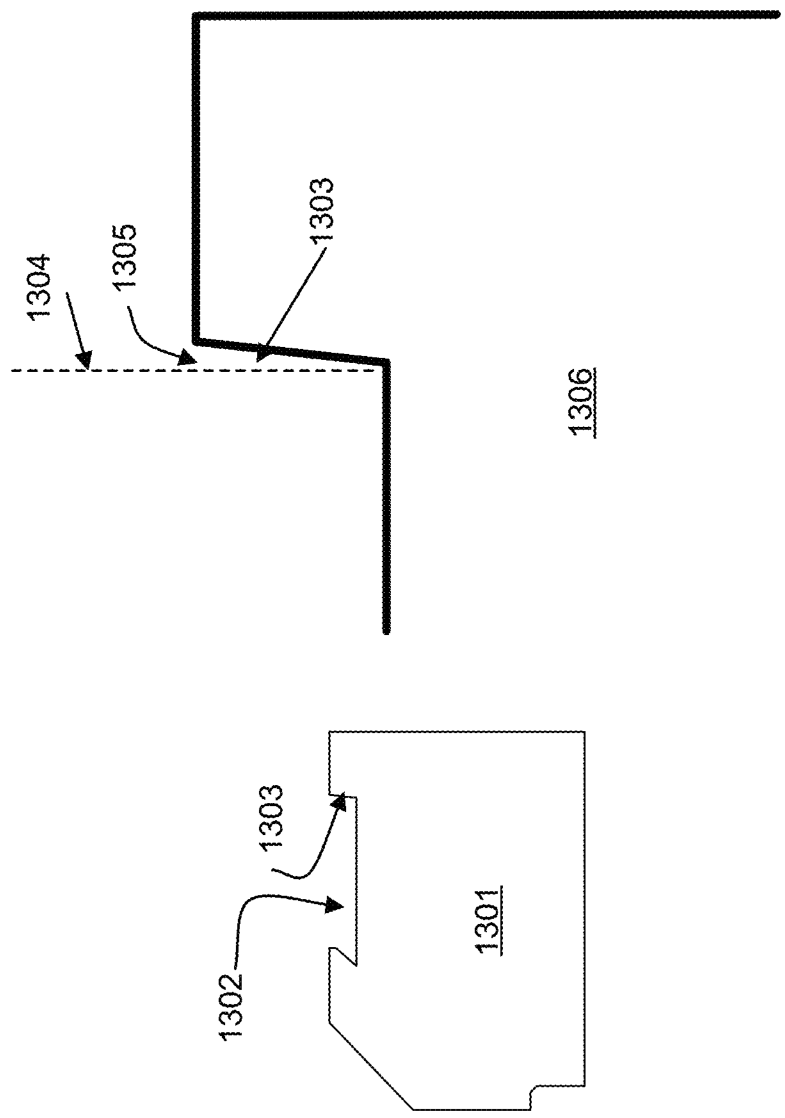
FIG. 13 shows the details of a first side of the dovetail groove of the fixture.

FIG. 13 shows the details of the dovetail groove 1302 of the fixture block 1301. In the close-up view 1306, the edge 1303 is seen to make an angle 1305 that is large than an angle that would be made with a vertical edge 1304. In the preferred embodiment the angle 1305 is between 1 and 10 degrees. In the preferred embodiments, the features of the block shown in FIG. 13 are included in the blocks discussed previously in conjunction with FIG. 1 (block 101) and FIG. 8 (block 801).

Figure 14:
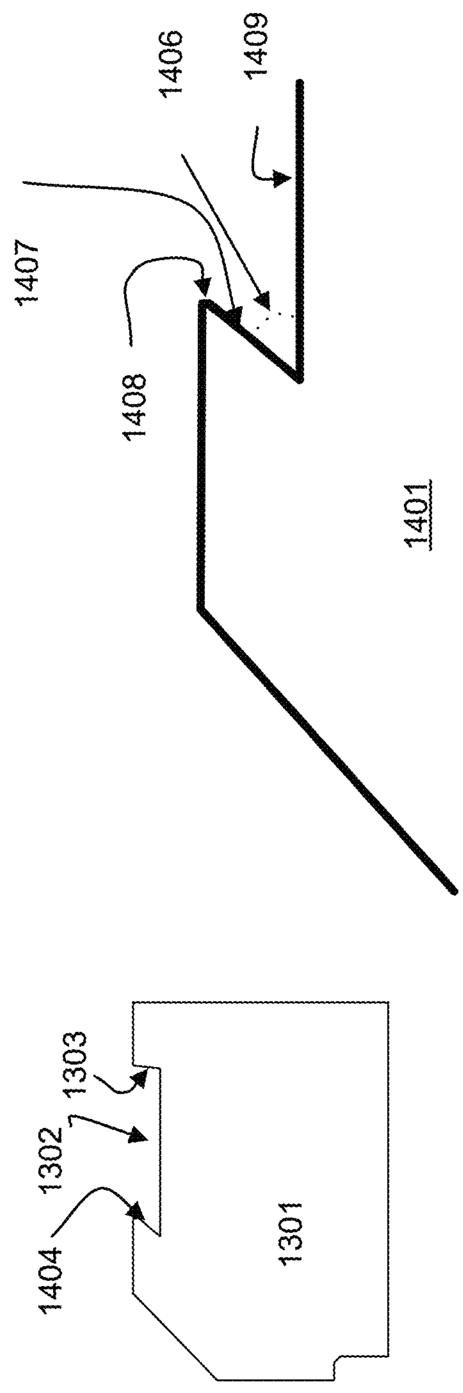
FIG. 14 shows the details of a second side of the dovetail groove of the fixture.

FIG. 14 shows details of the second edge 1404 of the dovetail groove 1002. The wall 1407 of the second edge forms an angle 1406 less than ninety degrees with the base of the groove 1409. The second edge 1404 further includes a small flat 1408. The flat 1408 and the fact that the opposite edge 1003 is greater than 90 degrees allows the user to insert the workpiece by positioning a dovetail edge of the work piece against the flat 1408 and rotate the work piece into the groove 1402. In the preferred embodiment the features discussed her in FIG. 14 are included in the fixtures presented in FIGS. 1 and 8 earlier.

Figure 15:
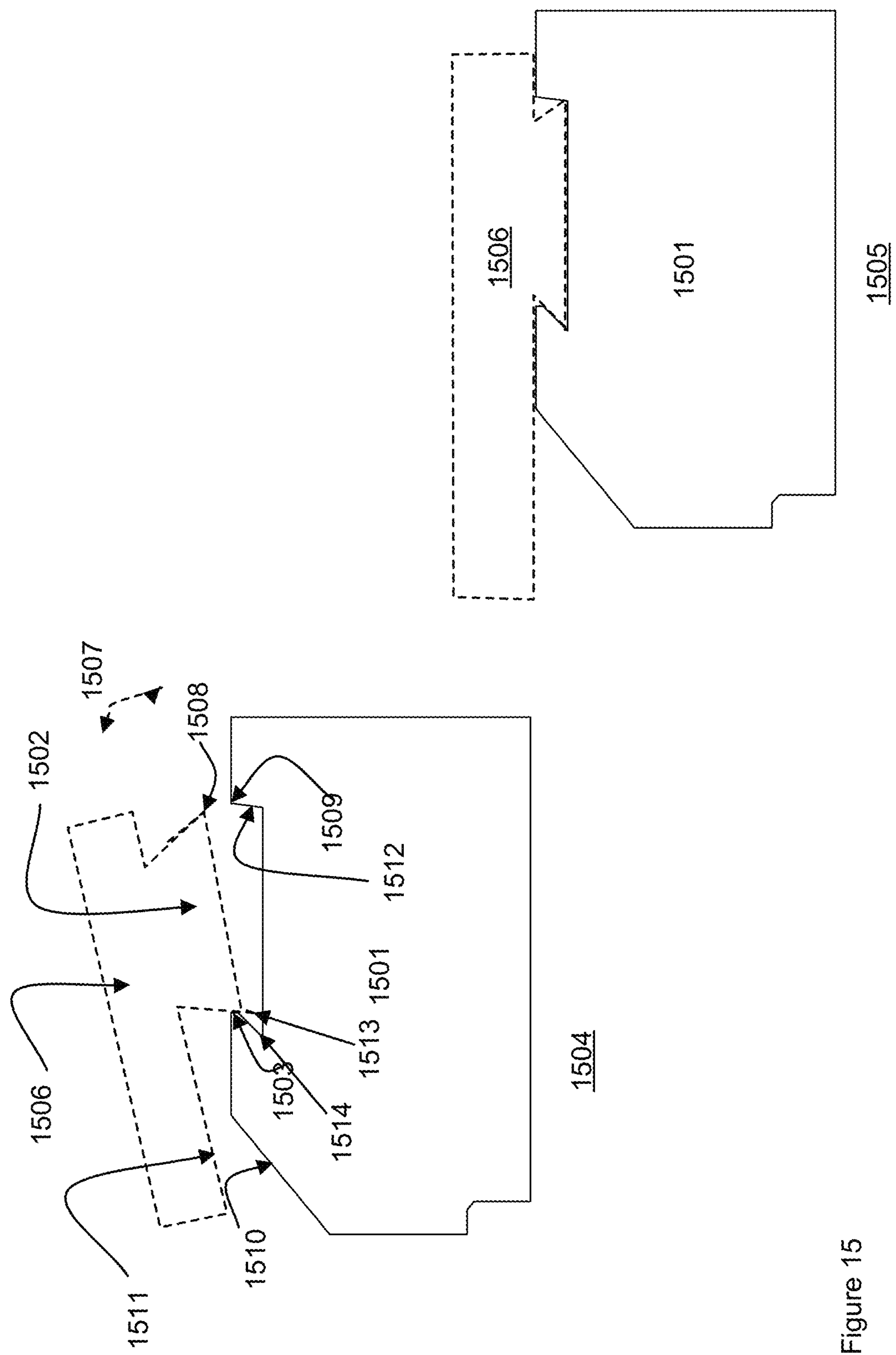
FIG. 15 shows the process of inserting a work piece into the fixture.

FIG. 15 shows the process for fitting a work piece 1506 into the dovetail groove of the fixture 1501. View 1504 shows the piece as it is inserted into the fixture and view 1505 shows the work piece fit into the fixture. The work piece 1506 includes a dovetail protuberance 1502. During insertion the top edge of the protuberance is placed against the flat 1503 and the work piece is rotated about angle 1507. When first fit against the flat 1503 the beveled corner 1510 is seen to allow greater clearance for the bottom edge 1511 of the work piece. Since the angle of the first edge 1512 of the groove in the fixture is greater than 90 degrees the corner 1508 on the work piece clears the corner 1509 on the fixture and as the work piece continues to rotate into position the slanted edge 1512 pushes the opposite edge 1513 of the dovetail protuberance on the work piece into the dove tail edge 1514. The work piece when fully seated 1505 is then clamped into place using the clamping block.

Cutter Tool

Figure 16:
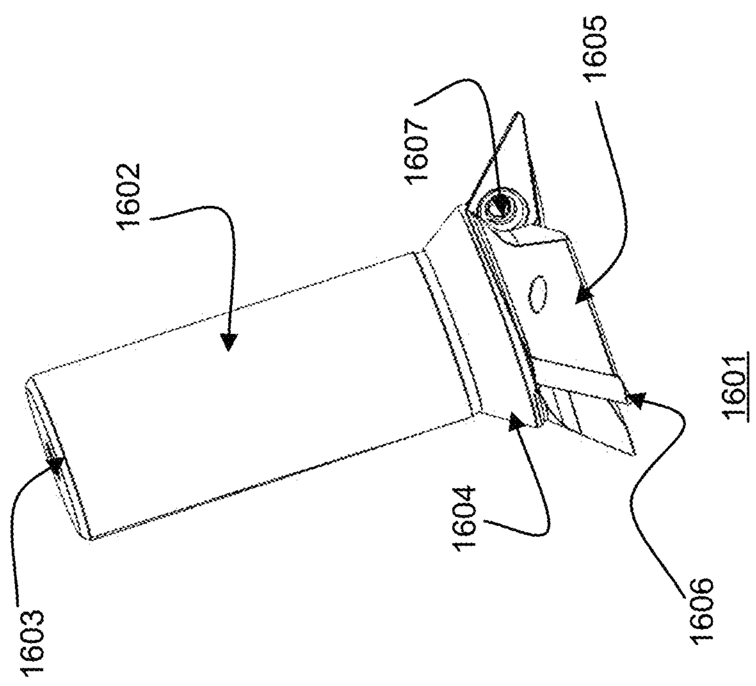
FIG. 16 shows a cutter tool to be used to prepare a work piece for use with the fixture.

Another embodiment, shown in FIG. 16, includes a cutter tool that is used to cut the dovetail protuberance on the work piece. The cutter tool 1601 is comprised a cylinder 1602. The cylinder includes a hole 1603 coaxial and through the length of the cylinder 1602 and a base 1604. A set of holders 1605 are attached to the base and cutting blades 1606 are attached to the cutter holders 1605. The blades 1606 are removably attached using the mounting holes 1607.

Figure 17:
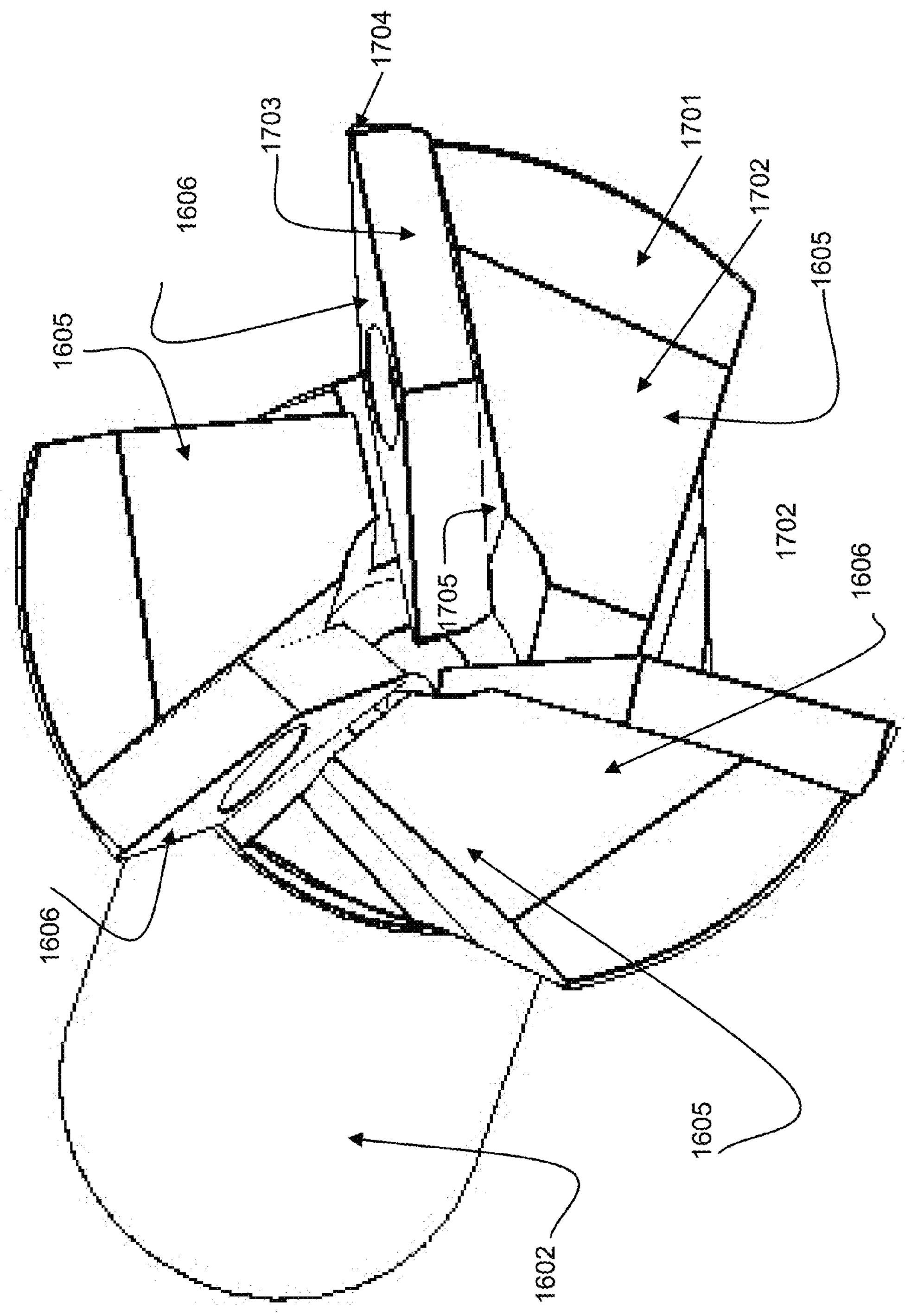
FIG. 17 shows a bottom view of the cutter tool of FIG. 13.

FIG. 17 shows a perspective bottom view of the cutter tool. The blades 1606 are seen to mount to a face 1705 of the holders 1605. Three holders and blades are used in the preferred embodiment and shown in the figure. The holder is seen to have a second face 1701 that is parallel to the face 1703 of the blade when attached and a third face 1702 that is not parallel to the edge 1703 of the blade. The blade is seen to further include a cutting section 1704 shaped such that it cuts the dovetail protuberance into the work piece. The angle of the face 1701 is the same as the angle 1406 on the dovetail groove of the fixture as shown in FIG. 14, thereby producing a work piece that fits to the fixture.

Figure 18:
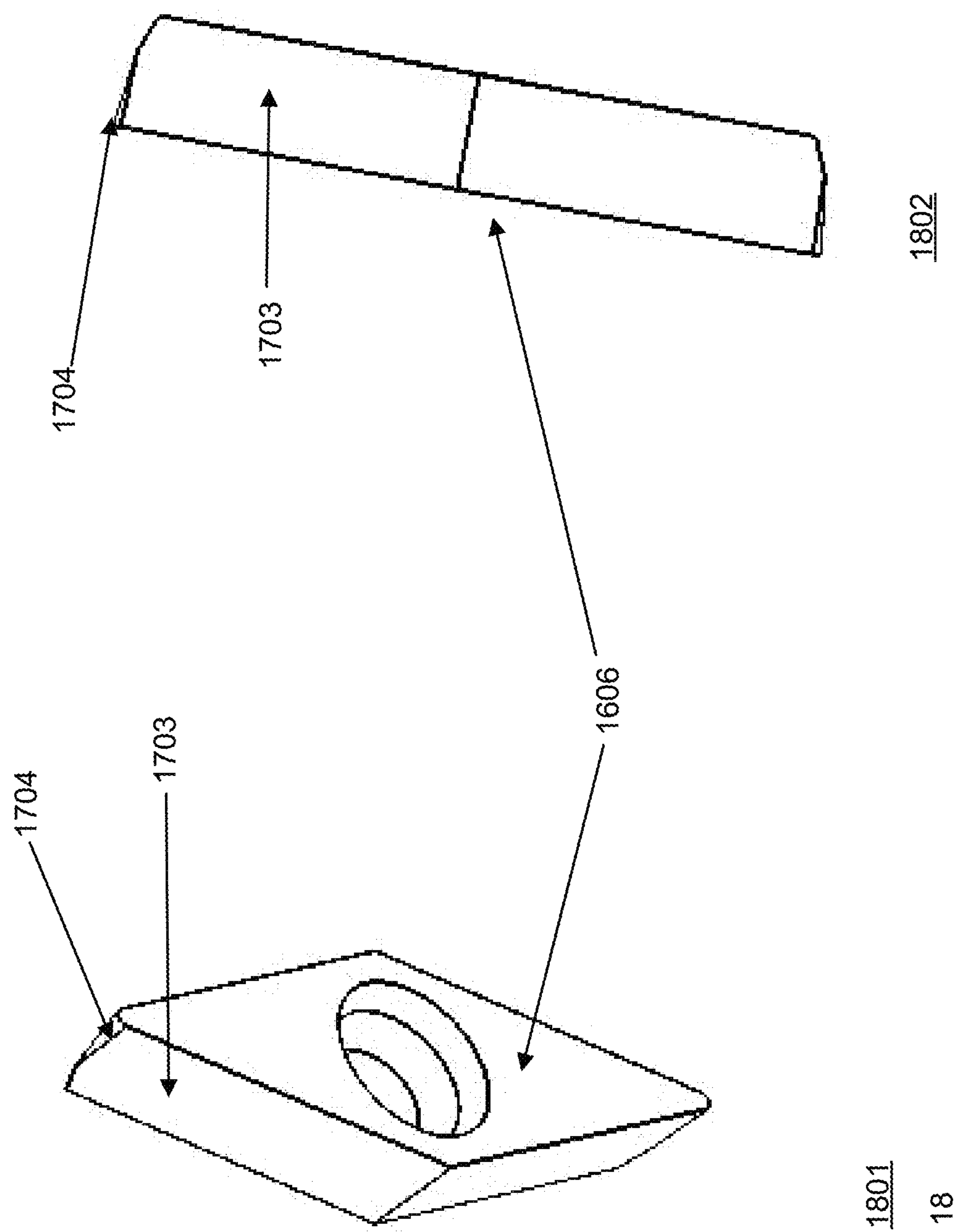
FIG. 18 shows two views of the cutter insert used in the cutter tool of FIG. 13.

FIG. 18 shows two additional views of the cutter blades 1606.

Another embodiment includes the cutting tool and the fixture as a system to mount a work piece for manufacture.

SUMMARY

A fixture and cutter tool is described. The fixtures includes features that enable a work piece to be easily mounted and removed by a rotation motion of the work piece onto the top of the fixture. The system includes the fixture and a cutter tool to prepare the work piece for use with the fixture.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. A tooling fixture comprising:

a) a fixture block having a dovetail groove having a first edge and a second edge, said first edge and second edge parallel to one another, b) a clamping block having a dovetail edge, c) a protruding V-shaped region on the fixture block that mates with an indented V-shaped region on the clamping block thereby aligning the clamping block with the fixture block such that when the V-shaped regions are mated, the first and second edges of the fixture block and the dovetail edge of the clamping block are all parallel to one another, d) a threaded hole passing through the protruding V-shaped region on the fixture block for receiving a screw, e) a hole on the indented V-shaped region on the clamping block, said hole aligned with the threaded hole passing through the protruding V-shaped region on the fixture block such that the screw is passed through the hole through the indented V-shaped region, and screwed into the threaded hole, and, when the screw is tightened, the protruding V-shaped region is mated with the indented V-shaped region thereby aligning the clamping block with the fixture block.

2. A system for mounting a work piece for manufacture including the tooling fixture of claim 1 and a cutter tool that is used to cut a dovetail protuberance upon the work piece said cutter tool sized and shaped to cut a protuberance being able to mate with the dovetail groove of the fixture block and the dovetail edge of the clamping block.

3. The tooling fixture of claim 1, wherein the dovetail groove has two edges and a base, said edges parallel to one another, and:

a) the first edge makes an angle greater than ninety degrees with the base, and, b) the second edge makes an angle less than ninety degrees with the base and thereby forms a receiving edge for a dovetail on a work piece, and, c) the second edge further includes a flat at the top of the second edge against which a work piece when positioned may be rotated into the dovetail groove.

* * * * *